Jan. 17, 1961   N. A. SCHUSTER   2,968,762
MAGNETIC RESONANCE METHODS AND APPARATUS
Filed Oct. 21, 1954                                     4 Sheets-Sheet 1
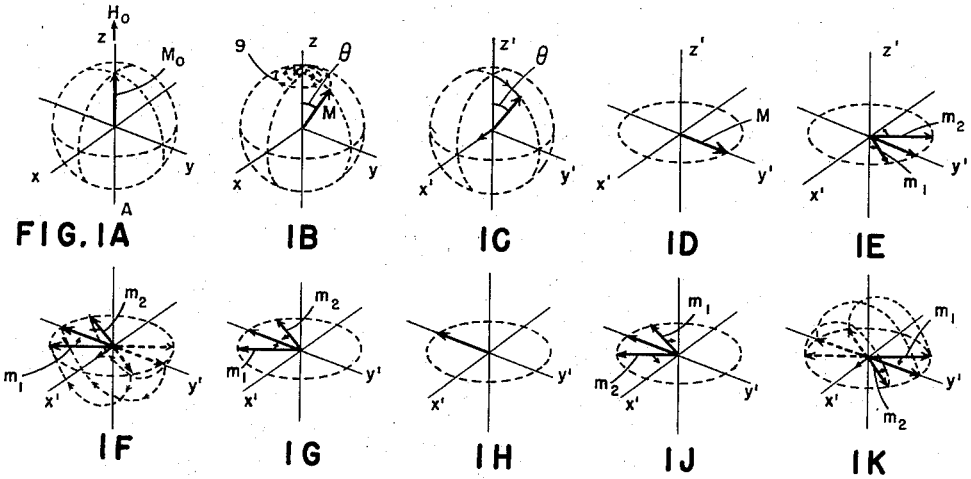
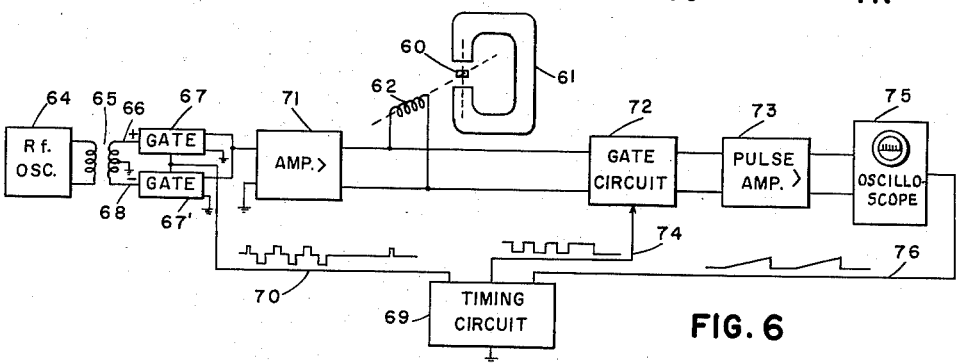
FIG. 6
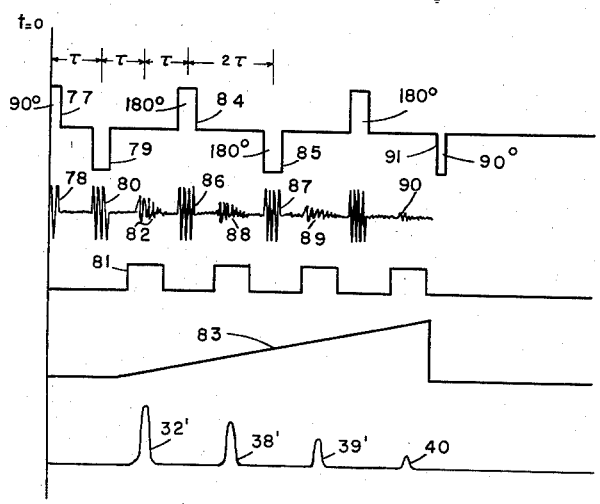
FIG. 7
INVENTOR.
NICK A. SCHUSTER
HIS ATTORNEY

INVENTOR.
NICK A. SCHUSTER
BY
HIS ATTORNEY

Jan. 17, 1961 N. A. SCHUSTER 2,968,762
MAGNETIC RESONANCE METHODS AND APPARATUS
Filed Oct. 21, 1954 4 Sheets-Sheet 4

INVENTOR.
NICK A. SCHUSTER
BY
HIS ATTORNEY

United States Patent Office 2,968,762
Patented Jan. 17, 1961

2,968,762
MAGNETIC RESONANCE METHODS AND APPARATUS

Nick A. Schuster, Ridgefield, Conn., assignor, by mesne assignments, to Schlumberger Well Surveying Corporation, Houston, Tex., a corporation of Texas Filed Oct. 21, 1954, Ser. No. 463,776

30 Claims. (Cl. 324—.5)

The present invention relates to magnetic resonance methods and apparatus, and more particularly to new and improved methods and apparatus for increasing substantially the observable signal in magnetic resonance techniques and which may be particularly useful, for example, in the non-destructive chemical analysis of materials, and in measurements of weak magnetic fields.

Nuclear and other paramagnetic resonances have been observed in the past, as disclosed, for example, in Patent No. 2,561,489, issued July 24, 1951, to Block and Hansen. In general, a sample exhibiting paramagnetic properties is placed in a constant, substantially homogeneous magnetic field. A radio-frequency activated coil at right angles to the constant magnetic field generates an alternating magnetic field in the sample. The frequency of the signal activating the coil and thus the frequency of the alternating magnetic field is selected equal to the resonance precession frequency of the paramagnetic particles in the constant field. The resonance may be observed, for example, in one of the following ways: (1) as a result of the absorption of energy from the alternating magnetic field; (2) as a result of the voltage at the precession frequency induced in a coil at right angles to both the constant magnetic field and the axis of the alternating field inducing coil; or (3) by modulating either or both of the magnetic fields, and detecting the effects of the modulation in accordance with either of the first two methods above. This latter method includes the spin-echo technique as reported, for example, by E. L. Hahn in an article entitled "Spin Echoes," Physical Review, vol. 80, page 580 (1950).

Such methods have been successful in the carefully controlled conditions of a laboratory, particularly where the material under observation is in fluid form. However, where such controlled conditions cannot exist for economic or practical reasons or where the material under observation is in the solid state, the stringent requirements of magnetic field homogeneity and of frequency stability, and the low signal-to-noise ratio have limited seriously the commercial and solid state applications of nuclear resonance techniques.

Accordingly, it is a primary object of the present invention to provide new and improved methods and apparatus for observing paramagnetic resonance phenomena, that are useful for example in non-destructive chemical analysis, and in the measurement of magnetic fields.

Another object of the invention is to provide paramagnetic resonance detecting methods and apparatus in which the required degree of frequency stability and of magnetic field homogeneity is less critical.

A further object of the invention is to provide paramagnetic resonance detecting methods and apparatus giving increased signal-to-noise ratio, whereby the signal resulting from precession is more readily and accurately observed.

These and other objects of the invention are attained by periodically reversing the phase of the radio-frequency signal generating the alternating magnetic field during each complete cycle of operation. While the alternating field of a given phase is being applied, the macroscopic magnetic moment associated with the paramagnetic particles in the constant magnetic field will nutate in a first direction as viewed from a rotating frame of reference. By periodically reversing the phase of the R.F. signal generating the alternating magnetic field, the macroscopic moment is caused to periodically reverse its direction of nutation. Such reversals maintain the macroscopic moment relatively unattenuated during each duty cycle even in the presence of substantial inhomogeneities in the magnetic fields, and with deviations of the radio frequency from the resonance precession frequency.

At the beginning of each cycle of operation the macroscopic moment is lined up with the constant magnetic field. After the periodically phase-reversed field has been applied during a given interval, it may be removed for the remainder of the cycle for a relaxation interval of duration sufficient to permit the disorder which has decreased the magnitude of the macroscopic moment to be "repaired." However, such relaxation interval is waste time insofar as the measured signal is concerned, since no measurements are made during such interval. In accordance with the present invention this second interval may be substantially reduced in time, thereby increasing the total period during which measurements may be made and thus increasing the signal-to-noise ratio. This is accomplished by nutating the macroscopic moment back into line with the constant magnetic field at the end of the period during which the alternating field is applied whereby the succeeding relaxation interval need only be long enough to repair the "damage" done to the macroscopic moment along the axis defined by the constant field.

The invention will be more fully understood with reference to the accompanying drawing, in which:

Fig. 1 is a series of vector diagrams employed to explain the invention;

Fig. 6 is an apparatus for utilizing spin-echo techniques in accordance with the invention; and Fig. 7 is a voltage and current diagram used to explain the operation of the apparatus shown in Fig. 6.

Figure 2:
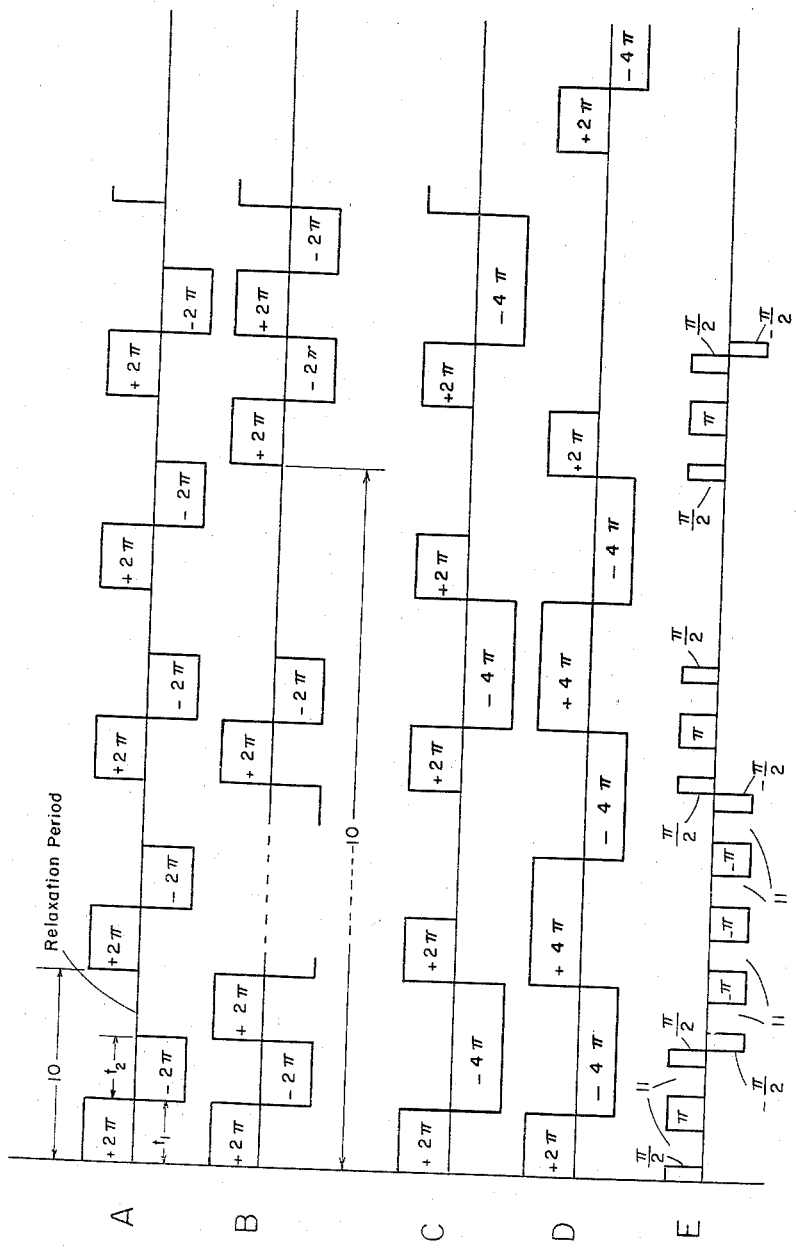
Fig. 2 is a series of pulse diagrams to show various modifications of the invention.

A brief explanation of some of the principles of magnetic resonance techniques may be of assistance in understanding the invention. In the vector diagram shown in Fig. 1A, a constant magnetic field of intensity $H_0$ is applied along the $z$ axis to particles exhibiting paramagnetic properties. After a period of time sufficient for thermal equilibrium to be reached, the net or macroscopic magnetic moment $M_0$ associated with the particles in the field $H_0$ is lined up with the constant field $H_0$ along the $z$ axis. If now a coil parallel to the $x$ axis is activated with an R.F. signal of frequency equal to the resonance precession frequency $f_0$, where $$f_0 = \gamma H_0 / 2\pi \tag{1}$$

and $\gamma$ is a constant (the gyromagnetic ratio) for the particular particles under observation, a magnetic field is generated which effectively rotates about the $z$ axis in the $x, y$ plane clockwise at the frequency $f_0$. The macroscopic moment $M$ will then precess about the $z$ axis as shown by the spiral path 9 and nutate through an angle $\theta$, as shown in Fig. 1B. The nutation will be more readily visualized if we place ourselves in a frame of reference rotating clockwise about the z axis at the frequency $f_0$. In this frame, the nutation of macroscopic moment M will appear to be a pure rotation through the angle $\theta$, as shown in Fig. 1C. At any given instant the angle $\theta$ is given by $$\theta = \gamma H t \quad (2)$$

where H is the effective intensity of the alternating magnetic field, and $t$ is the time elapsed since the application of the alternating field. As is well known, the actual applied intensity of the alternating field must be 2H, since only one half of this field is effective. Hereinafter, only the effective intensity of this field will be referred to, it being understood that the actual intensity must be twice this value.

In one embodiment of the present invention, when an R.F. field of intensity $H_1$ has been applied for a time $t_1$ and the macroscopic moment M has nutated through an angle $\theta_1$, as determined in accordance with Relation 2 above, the phase of the R.F. signal is instantaneously reversed and thus the macroscopic moment M will reverse direction of rotation shown in Fig. 1C and counter-rotate through an angle $\theta_2$, dependent on $t_2$, the time elapsed since the application of the reversed phase R.F. signal and $H_2$, the magnitude of the alternating magnetic field during the interval $t_2$.

In one example, the R.F. field may be applied as two immediately successive pulses of opposite phase and of magnitudes $H_1$ and $H_2$ and durations $t_1$ and $t_2$ respectively, such that $\theta_1 = -\theta_2$, followed by a relaxation period to permit substantial restoration of the macroscopic moment along the z axis, and the cycle repeated indefinitely or until the desired measurement is completed. Such a sequence will be herein designated:

$$+\theta, -\theta \quad (3)$$

Accordingly, the macroscopic moment M is nutated away from the z axis by an angle $\theta_1$ and then immediately back to the z axis, followed by a relaxation period which may be on the order of 3 to 30 times $(t_1+t_2)$. In a preferred form of this embodiment $\theta_1$ is made equal to 360° ($2\pi$ radians). This sequence is shown schematically in Fig. 2A.

However, many more than two alternately phase reversed pulses may be employed before each relaxation period. Such a sequence will be herein designated:

$$+\theta, -\theta, +\theta, -\theta, \ldots +\theta, -\theta \quad (4)$$

Thus the R.F. signal may be applied as a series of pulses of alternately opposite phase, such that $$\gamma H_1 t_1 = -\gamma H_2 t_2 = \gamma H_3 t_3 = \ldots = -\gamma H_n t_n \quad (5)$$

where $t_3 \ldots t_n$ are the time durations and $H_3 \ldots H_n$ are the field magnitudes of successive pulses, and $n$ is an even number. If, as suggested above, the series in Relation 5 is made equal to $2\pi$ radians, the first pulse "flips" the macroscopic moment M, initially aligned with the z axis, clockwise through 360° back to the z axis, the second pulse "flips" moment M counterclockwise 360° back to the z axis, and so forth. This sequence is shown in Fig. 2B.

In practice, the alternating field magnitudes $H_1$, $H_2$, $H_3 \ldots H_n$ and the pulse durations $t_1$, $t_2$, $t_3 \ldots t_n$ may be made equal, and thus each pulse may have the same magnitude and duration, but the phases of the R.F. signals in alternate pulses are reversed.

The number of pulses in any given cycle 10 may be as few as two, one "positive," the other "negative," as described in Relation 3 and shown in Fig. 2A up to many hundreds as represented in Relations 4 and 5 and shown in Fig. 2B. The greater the number of pulses in any one cycle, the greater must be the relaxation period, by approximately the square of the number of pulses. However, the total time taken by any series of pulses must be short compared with the relaxation time $T_1$ associated with the precession. It will be understood that the actual phase of the R.F. signal during the first pulse is of no significance and is termed "positive" to distinguish its phase from the next, oppositely phased or "negative" pulse.

Many other sequences of pulses may be applied in accordance with the invention. It is not necessary that every reversal nutate the macroscopic moment through an angle $\theta$ equal to the angle of the first nutation in a given cycle. For example, the following sequence is appropriate:

$$+\theta, -n\theta, +n\theta, \ldots +n\theta, -n\theta, +\theta \quad (6)$$

where $n$ is a whole number. This will give particularly good results when $n=2$. Thus the first pulse may be of duration and magnitude sufficient to flip the macroscopic moment M by 360° ($2\pi$ radians), the next by $-720°$ ($-4\pi$ radians), with the last $+360°$ ($2\pi$ radians), followed by a relaxation period after which the cycle is repeated, as shown in Fig. 2C. As shown in Fig. 2D, the series may be extended with the addition of $+4\pi$ and $-4\pi$ pulses.

In Relations 3, 4 and 6, the angle $\theta$ need not be selected equal to multiples of $2\pi$ but angles less than $\pi/2$ are not recommended, since it is desirable to nutate the macroscopic moment at least into the plane in which measurements are obtained, nor should $\theta$ be greater than $8\pi$ radians where substantial field inhomogeneities are encountered.

From the foregoing analysis it appears that the macroscopic moment M is always nutated by a known amount, and is based on the assumption that the fields $H_0$, $H_1$, etc., are perfectly homogeneous and that the frequency $f_0$ is exactly equal to the precession frequency, an assumption not capable of realization in practice. In fact, the macroscopic moment when the fields are not homogeneous or the frequency is not correct will not nutate by the expected amount, and this disorder tends in conventional methods of nuclear resonance observations to quickly attenuate the resonance signal, thus making detection difficult in solid state samples or under field conditions outside of laboratories. However, by reversing the phase of the R.F. signal and thus reversing the direction of nutation of the macroscopic moment in accordance with the present invention, this attenuation is minimized. This maximizes the total percentage of time that a relatively unattenuated signal may be observed.

The magnetic resonance induced in the paramagnetic particles of the sample may be observed during the period when the R.F. pulses are being applied, by any of the known methods not involving free precession, such as, for example, by induction, absorption or dispersion. However, the presence of the relatively large R.F. signal during the interval when the small resonance signal of the same frequency is to be detected may cause practical difficulties, and in accordance with the present invention the resonance signal may, if desired, be detected in the absence of the large R.F. activating signal. For example, the pulse sequence described in connection with Fig. 2C may be modified as shown in Fig. 2E. The first R.F. pulse nutating the magnetic moment in a first direction by $2\pi$ radians may be broken into a series of shorter R.F. pulses of the same phase separated by intervals 11 of free precession during which measurements may be made. The total nutation will still be $2\pi$; however, the nutation is interrupted at $$\frac{\pi}{2} \text{ and } \frac{3\pi}{2}$$

where the resonance signal will be a maximum for measurements. Subsequent negative and positive pulses are interrupted in the same manner. This principle may be applied to any of the pulse sequences described generally in Relations 3, 4, and 6.

Figure 3:
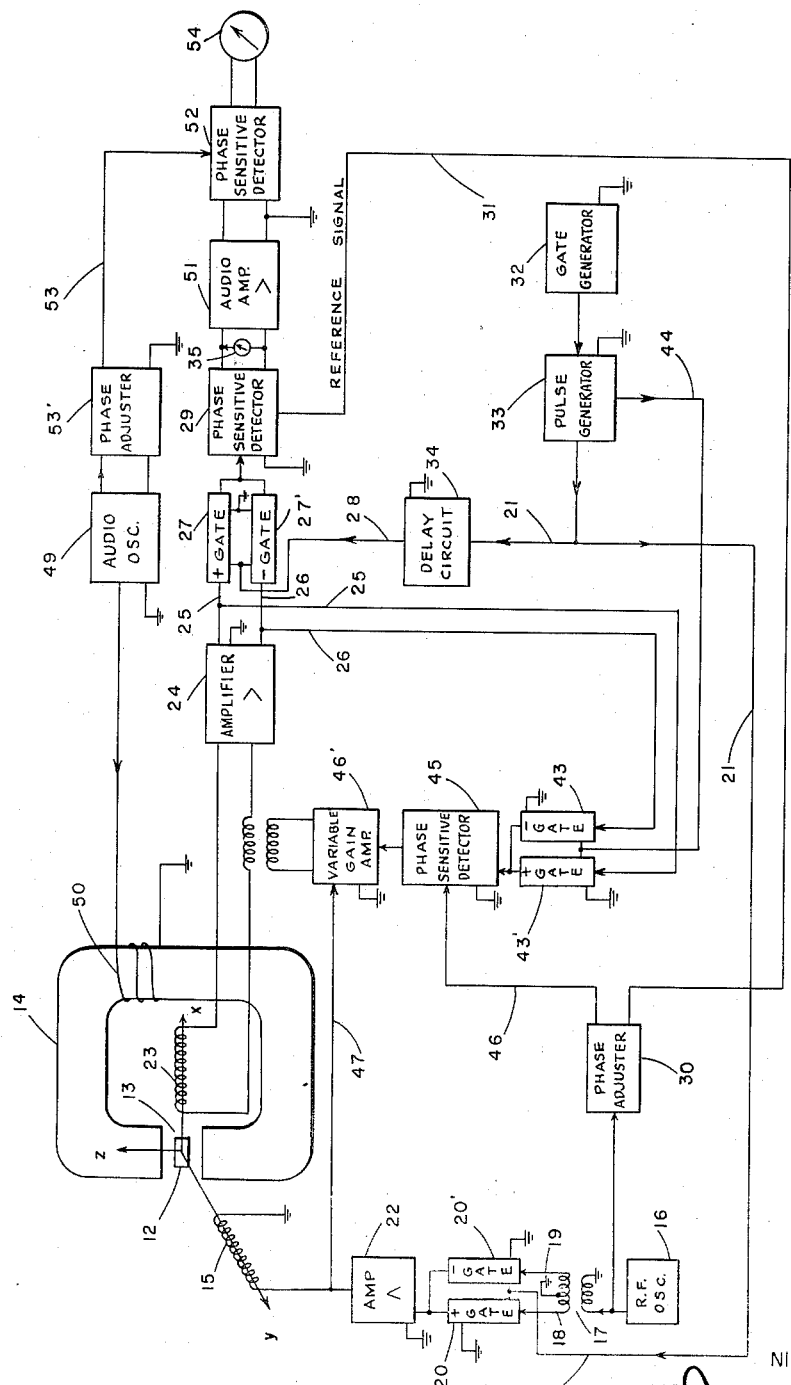
Fig. 3 is a typical apparatus constructed in accordance with the invention.

A preferred apparatus for detecting magnetic resonance during the periods in which the R.F. field is applied is shown schematically in Fig. 3. In Fig. 3, a sample 12 is placed in a constant, substantially homogeneous magnetic field $H_0$ provided in gap 13 of magnet 14 shown as a permanent magnet but preferably an electromagnet. At right angles to field $H_0$, coil 15 is adapted to generate the R.F. field. The output of an R.F. generator 16, preferably crystal controlled, is applied to a phase splitting transformer 17 giving signals of equal amplitude but opposite phase on conductors 18 and 19. Conductors 18 and 19 are connected to the inputs of gate circuits 20 and 20' respectively, which are normally closed, but are adapted to be opened by positive and negative gate pulses, respectively, from conductor 21. When gate circuit 20 is open, R.F. of one phase is applied via amplifier 22 to coil 15; when gate circuit 20' is open, R.F. of opposite phase is applied to coil 15 via amplifier 22.

The output of a pick-up coil 23 substantially at right angles to the field $H_0$ and to the axis of coil 15 is connected to amplifier 24, the outputs 25 and 26 of which being of equal amplitude but of opposite phases. Outputs 25 and 26 are applied to gate circuits 27 and 27' similar to circuits 20—20' activated by the trigger conductor 28. The outputs of circuits 27 and 27' are applied to a phase sensitive detector 29 receiving a synchronizing signal from oscillator 16 via phase adjuster 30 and conductor 31. The system is synchronized via gate generator 32 and pulse generator 33. Outputs of generator 33 are applied to conductor 21, and to conductor 28 via delay circuit 34. The output of detector 29 may be observed on a meter 35.

Figure 4:
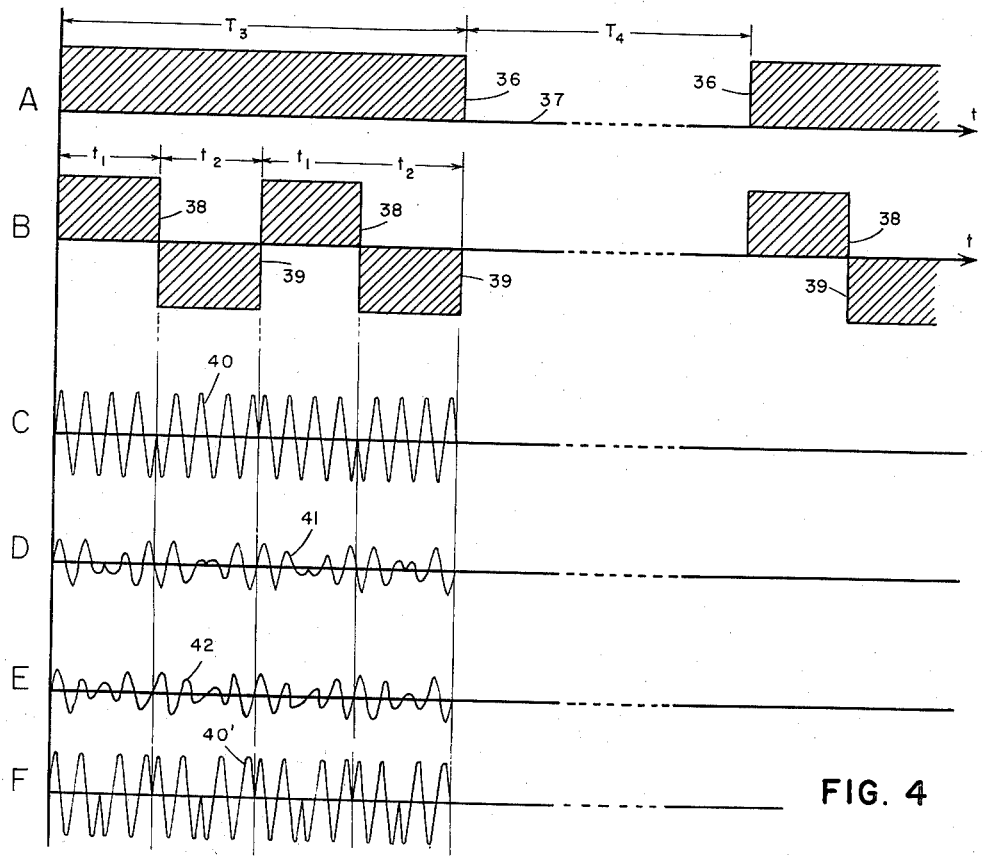
Fig. 4 is a voltage and current diagram employed to explain the operation of the apparatus shown in Fig. 3.

The operation of the circuit thus far described may be better understood with reference to the voltage and current diagrams shown in Fig. 4. Assume that it is desired to generate a series of $2\pi$ R.F. pulses of alternately opposite phases followed by a period of no R.F. signal, as described in connection with Fig. 2B above, and that the field amplitudes $H_1$, $H_2$, $H_3$, etc., and the times $t_1$, $t_2$, $t_3$, etc., are equal. For convenience hereinafter the times of the positive pulses will be designated $t_1$, the negative $t_2$, and the intensities of the R.F. fields as $H_1$.

As shown in Fig. 4, gate generator will generate a gate pulse 36 of duration $T_3$ where $T_3 = p(t_1+t_2)$, $p$ being the number of pairs of positive and negative R.F. pulses desired. Pulse 36 is followed by a blank period 37 of duration $T_4$, and the cycle repeated. When gated by pulse 36, pulse generator 33 puts out a series of positive and negative pulses 38 and 39, respectively, of durations $t_1$ and $t_2$. During the interval $T_3$, gate circuits 20 and 20' alternately apply pulses containing R.F. energy of frequency $f_0$ but of opposite phases, and during the interval $T_4$ no alternating current, to amplifier 22, as shown in diagram C. Where the number of R.F. cycles is small during the periods $t_1$ and $t_2$, it may be desirable to synchronize generators 32 and 33 from oscillator 16, as through a suitable frequency divider (not shown) to permit accurate phasing of the R.F. signal relative to the gate pulses. In diagram C representing the current 40 passing through coil 15, during the first period $t_1$, current of given amplitude and of one phase generates the alternating field $H_1$ in sample 13. After period $t_1$, coil 15 receiving current of opposite phase generates the next field $H_1$. The application of fields $H_1$ may be repeated $p$ times, where in Fig. 4, $p=2$. Thereafter the coil 15 is unenergized for the period $T_4$.

Fields $H_1$ will cause precession of the paramagnetic particles in sample 12 which may be detected in coil 23 substantially at right angles to both $H_0$ and coil 15. The presence of this signal is indicative of the magnetic resonance in sample 12. The voltage 41 modulated at the nutational frequency induced in coil 23 as a result of the resonance is shown in Fig. 4D. It should be noted that voltage 41 reverses phase midway between the phase reversals of energizing current 40, i.e., at $\frac{1}{2}t_1$, $\frac{1}{2}t_2$, etc. Voltage 41 may be detected in a variety of ways.

However, since coils 15 and 23 cannot, as a practical matter, be perfectly at right angles, current 40 through coil 15 will induce an undesired signal in coil 23 which may be large compared to the desired voltage 41. The apparatus shown in Fig. 3 is designed to eliminate the undesired voltage. The voltage output of coil 23 is fed through amplifier 24 to gate circuits 27 and 27' which, as a result of the action of the gating pulses from conductor 28 delayed $\frac{1}{2}t_1$ by circuit 34, reverse the polarity of the signal applied to detector at times $\frac{1}{2}t_1$, $\frac{1}{2}t_2$, etc. (and disconnects the detector during the period $T_4$). Thus, as shown in Fig. 4E, the voltage 41 induced as a result of the resonance is transformed into a modulated alternating voltage 42 of no phase reversals for application to detector 29. However, as shown in Fig. 4F any voltage induced directly in coil 23 by current 40 in coil 15 is transformed by gate circuits 27 and 27' into a voltage 40' with phase reversals at intervals $\frac{1}{2}t_1$.

Detector 29 is of the balanced phase sensitive type and receives a reference or sensitizing signal from oscillator 16 in phase with voltage 42. Thus the output of detector 29 resulting from voltage 42 is a D.C. signal proportional to the amplitude of voltage 42, while the output resulting from voltage 40' will reverse polarity twice for each interval $t_1$ and may thus be readily filtered or damped out, whereby the input to meter 35 is a D.C. signal of amplitude varying in accordance with the resonance signal 41.

Where more accurate and closely controlled measurements of detected magnetic resonance are desired, the remainder of the circuit shown in Fig. 3 may be used. The voltage from detecting coil 23 after amplification by amplifier 24 is additionally fed by conductors 25 and 26 to gate circuits 43 and 43' controlled via conductor 44 from generator 33. The phasing of circuit 43 and 43' is such that the phase of the signal applied to phase sensitive detector 45 is reversed at the end of periods $t_1$, $t_2$, etc., whereby any voltage induced in coil 23 directly from coil 15 is tranformed into an A.C. signal with no phase reversals, but the resonance signal is periodically phase reversed. The phase sensitive detector 45 receives a sensitizing signal via conductor 46 from phase adjuster 30 in phase with said A.C. signal of no phase reversal and gives an output D.C. signal proportional to any voltage induced in coil 23 directly from coil 15. The operation of gate circuit 43 and 43' and detector 45 is similar to the operation of circuits 27, 27' and 29, except that the latter is sensitive to the resonance signal, while the former is sensitive to the undesired directly induced voltage.

The D.C. voltage from detector 45 is applied to control the gain of a variable gain circuit 46'. Variable gain circuit 46' in addition receives a potential in phase with the current applied through coil 15 via conductor 47. The output 48 of variable gain circuit 46' is a signal 180° out of phase with any signal induced directly in coil 23 from coil 15, the amplitude of which varies in accordance with said induced signal. In accordance with the principles set forth in copending application Serial No. 750,-307, filed May 24, 1947, by H. G. Doll entitled "Phase Rejection Networks," issued as Patent No. 2,788,483 on April 9, 1957, it can be seen that any signal directly induced from coil 15 to coil 23 is substantially canceled out in the input to amplifier 24.

In addition to aid in the detection of the magnetic resonance, the field $H_0$ supplied by coil 50 may be modulated at an audio rate, by means of an audio oscillator 49 coupled to a coil 50 on magnet 14. This will cause the amplitude of signal 42 applied to the input of phase sensitive detector 29 to vary at an audio rate in proportion to the magnetic resonance induced in sample 12. The audio output of phase sensitive detector 29 may be applied to an audio amplifier 51 and thence to a phase sensitive detector 52 energized by sensitizing signal from audio oscillator 49 via conductor 53 and phase adjuster 53'. Thus the audio modulation is detected by phase sensitive detector 52 and the detected signal may be indicated on a D.C. meter 54.

In a typical example, if $p=2$ as in Fig. 4 and it is desired to detect proton resonance in sample 12, where $\gamma=2.67\times10^4$, the following values may be used:

$H_0=500$ gauss  $t_1=t_2=23.6$ μsec.
$f_0=2.12$ mc./s.  $T_4=250$ μsec.
$H_1=10$ gauss It will be apparent to those skilled in the art that other types of detecting circuits may be employed. In the apparatus shown in Fig. 3 if the pulse widths are $\pi$ instead of $2\pi$, the signal polarity will not reverse in the detecting coil, and these figure may be simplified by the deletion of the delay circuit 34. In addition, it will be understood that gate circuit 32 may be employed to deactivate any desired circuits during the period $T_4$ in order to reduce the noise even further.

Figure 5:
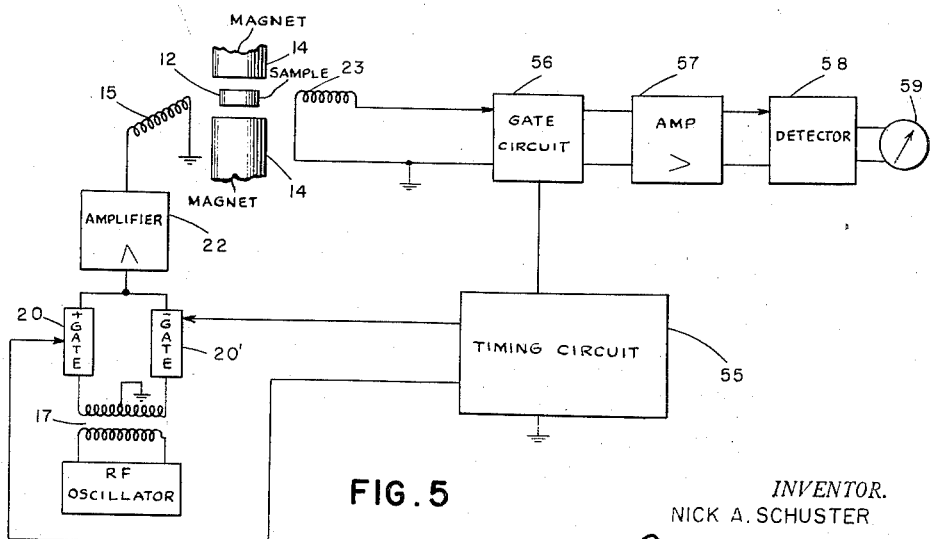
Fig. 5 is another apparatus constructed to carry out the present invention.

When the modification described in connection with Fig. 2E above is employed, the circuit may be simplified as shown in Fig. 5, wherein the resonance is detected during periods of free precession when no R.F. signal is applied. In Fig. 5, where like numerals indicate elements similar to those shown in Fig. 1, a basic timing circuit 55 controls circuits 20 and 20' to give the R.F. signal in accordance with Fig. 2E. Timing circuit 55 also controls gate circuit 56 to connect detecting coil 23 to amplifier 57, detector 58 and meter 59 during the intervals 11 in Fig. 2E.

In a second embodiment of the invention, spin-echo techniques may be employed in accordance with the invention, and in this connection a brief explanation of the technique as it is conventionally understood may be of assistance, by reference again to Fig. 1. As explained in connection with Figs. 1A—C, the first R.F. pulse will nutate the total macroscopic moment M through an angle $\theta$ referred to in Relation 2 above. As shown in Fig. 1D, the first R.F. pulse may nutate total macroscopic moment M through an angle $$\theta=\frac{\pi}{2}$$

radians, and then be removed. Such a pulse is herein designated a 90° pulse. When the 90° pulse is removed, total macroscopic moment M will lie in the equatorial plane defined by rotating axes $x'$ and $y'$.

However, total macroscopic moment M is in fact comprised of individual macroscopic moments from separate volume elements in the sample under test. Due to the fact that the constant field $H_0$ is not perfectly homogeneous, some of the volume elements will lie in fields greater than $H_0$, some in field less than $H_0$. During the period of free precession, the macroscopic moment $m_1$ associated with volume elements in a field greater than $H_0$ will precess at a frequency greater than $f_0$. See Relation 1 above. The macroscopic moment $m_2$ associated with volume elements in a field less than $H_0$ will precess at a frequency less than $f_0$. As viewed from the rotating frame of reference, moments $m_1$ and $m_2$ will appear to fan out as shown in Fig. 1E.

If now after the fanning out, a 180° pulse of the same phase as the 90° pulse is applied, the $y'$ components of the moments $m_1$ and $m_2$ will be flipped 180° as shown in Fig. 1F but will maintain their relative positions. During the period of free precession following this 180° impulse, moments $m_1$ and $m_2$ will tend to approach the $y'$ axis as shown in Fig. 1G. When they reach the $y'$ axis, a relatively large signal may be detected which is known as an echo. As shown in Fig. 1J, the moments $m_1$ and $m_2$ again appear to fan out. Again a 180° pulse may be applied as shown in Fig. 1K, and the process repeated.

The foregoing explanation is satisfactory where the inhomogeneity of the field is small, for example, a few hundredths of one percent. If, however, the field has substantial inhomogeneity, the above explanation is no longer valid. Moments $m_1$ and $m_2$ which are in fields substantially different from $H_0$ or $H_1$ will not be flipped the 90° angle shown in Fig. 1E, but both by a greater amount $90°+\Delta\theta$. The next pulse will not flip the moments $m_1$ and $m_2$ by the 180° angle shown in Fig. 1F but by $180°+2\Delta\theta$, or a total of $3\Delta\theta$, away from the equatorial plane. Since the effect is cumulative, the next 180° pulse will flip moments $m_1$ and $m_2$ even further from the equatorial plane, by an amount $5\Delta\theta$, and so forth. Where the inhomogeneity is substantial, $\Delta\theta$ is not negligible, and the resulting disorder causes the echo signals to decay very quickly, thus decreasing the amount of signal observable in any one cycle whereby the signal-to-noise ratio is decreased substantially.

In accordance with the present invention, this disorder and the resulting decay are substantially eliminated. In one example as in the above-described spin-echo technique, the first 90° pulse will flip those moments $m_1$ and $m_2$ not in the fields of magnitude $H_0$ or $H_1$ by an amount $90°+\Delta\theta$. However, for the next pulse the phase of the R.F. field is shifted 180°, causing the moments to rotate counter-clockwise. This negative pulse is of duration such to flip the macroscopic moment M by $-180°$. However, those moments $m_1$ and $m_2$ not in fields of magnitude $H_0$ or $H_1$ will be flipped by $-180°-2\Delta\theta$. It can be seen, therefore, that moments $m_1$ and $m_2$ will be only $-\Delta\theta$ away from the equatorial plane.

The next 180° pulse is positive, flipping moments $m_1$ and $m_2$ only $\Delta\theta$ away from the equatorial plane. Alternately negative and positive pulses thereafter keep the disorder at this low level, thereby minimizing decay due to inhomogeneity in field $H_0$ and field $H_1$. Thus the amplitude of the echoes in the free precession intervals between 180° pulses will be substantially increased.

A final 90° pulse is preferably applied before the relaxation interval to bring the macroscopic moment M back into line with the $H_0$ field along the $z$ axis, with the result that the relaxation interval may be shortened as explained in connection with the first embodiment.

Typical apparatus constructed to carry out a spin-echo embodiment of this invention is shown in Fig. 6. A sample 60 is placed in a strong constant magnetic field provided by magnet 61 which may be permanent as shown, but is preferably an electromagnet. Assume that the conditions are the same as described in connection with Fig. 3: sample 60 is subjected by magnet 61 to a field $H_0=500$ gauss; if sample 60 is water, for proton resonance $\gamma=2.67\times10^4$ and the precession frequency will again be 2.12 mc.

At right angles to field $H_0$ is a coil 62 adapted to supply pulsed R.F. field of magnitude $H_1$. A crystal-controlled oscillator 64 continuously supplies R.F. at frequency $f_0$ to phase-splitting transformer 65 whereby the input 66 to gate circuit 67 is of one phase, and input 68 to gate circuit 67' of opposite phase. When gate circuit 67 is supplied with a positive voltage from timing circuit 69 via conductor 70, conductor 66 is connected through to R.F. amplifier 71. When gate circuit 67' is supplied with a negative voltage, conductor 68 is connected to amplifier 71. Otherwise conductors 66 and 68 are open-circuited from the input to amplifier 71. The output of amplifier 71 is applied across coil 62.

Coil 62 is also connected across gate circuit 72, which connects coil 62 to pulse amplifier 73 when a positive pulse is received via conductor 74 from timing circuit 69. The output of pulse amplifier 73 is applied to appropriate measuring device 75, such as a cathode ray oscilloscope synchronized by a sweep signal from timing circuit 69 via conductor 76.

In operation conductor 66 is continuously supplied with an R.F. voltage of frequency $f_0$ and of given phase, and conductor 68 is supplied with an R.F. voltage of frequency $f_0$ but of opposite phase. At time $t=0$ after sample 60 has been in $H_0$ long enough to reach thermal equilibrium, a positive gating pulse 77 is applied to gate circuit 67, as shown in Fig. 7. Thus gate pulse 77 is just exactly long enough to permit a 90° positive pulse 78 to be supplied from oscillator 64 via amplifier 71 to coil 62, as determined from Relation 2 above where $\theta=\pi/2$. If the field $H_1$ generated by coil 62 is 10 gauss, the duration of the 90° pulse should be 5.9 $\mu$sec. After a free precession period $t=\tau$, say 15 $\mu$sec., a negative gate pulse 79 twice as wide as pulse 77 is applied to gate circuit 67', thus applying a negative 180° pulse to coil 62, since with this apparatus the "positive" and "negative" fields have the same magnitudes, $H_1$. During this period amplifier 73 is blocked from coil 62 by gate circuit 72.

After pulse 80 has died out, a gate pulse 81 is applied to gate circuit 72. At time $2\tau$ an echo 82 will appear in coil 62, which will be amplified by amplifier 73 and seen as pulse 82' on oscilloscope 75 swept by sawtooth wave 83. Additional positive and negative pulses 84, 85, etc., will apply positively and negatively phase R.F. impulses 86, 87, etc., to coil 12, which in turn create echoes 88, 89, etc., viewed as decaying pulses 38', 39', etc. After the last echo 90 is obtained, a negative 90° pulse 91 is applied, and the R.F. energy is turned off for a period long enough to allow thermal equilibrium to be reached in sample 60, and then the sequence is repeated. As explained above, the alternating positive and negative pulses 78, 80, 86, 87, etc., have the effect of substantially eliminating the disorder due to inhomogeneity, and the last pulse brings the macroscopic moment into line with the field $H_0$.

It will be understood that the foregoing is only a preferred pulse sequence and that others may be employed in accordance with the invention. For example, in lieu of alternately positive and negative pulses, a series of positive pulses followed by a series of negative pulses may be employed during one cycle. In addition, many spin-echo sequences other than $+90°$, $-180°$, $+180°$, ... $+180°$, $-90°$ may be employed. For example at time $t=0$ a positive 90° pulse is applied, followed by free precession period $\tau$. Then a 180° negative pulse is applied followed by a $2\tau$ free precession period during which the echo is detected. Then a positive 90° pulse followed by a negative 90° pulse is applied with no period of free precession therebetween. After a free precession period $\tau$, a positive 180° pulse is applied followed by a $2\tau$ free precession period during which a second echo is detected. Then a negative 90° pulse followed immediately by a 90° positive pulse corresponding to the first 90° pulse is applied, and the sequence repeated during one cycle, and the cycles repeated after periods during which thermal equilibrium is reached.

Regardless of the detection method employed, if the value of the field $H_0$ is known, the present invention may be employed for chemical analysis of unknown samples, or if the sample is known, the magnitude of the field $H_0$, for example the earth's field, may be determined. The invention finds particular utility in commercial applications where a high degree of field homogeneity may not be practical, for example in well logging techniques as disclosed for example in my copending application Serial No. 330,978, filed January 13, 1953, for "Analysis of Substances by the Measurement of Nuclear Magnetic Relaxation Times," or in copending application Serial No. 414,379, filed March 5, 1954, by H. F. Schwede for "Nuclear Resonance Well Logging Method and Apparatus."

It will be understood that many different types of apparatus may be employed to carry out the principles of the invention. For example, in lieu of a switching arrangement for periodically reversing the phase of the alternating current generating the R.F. magnetic field, the phase of the output of the R.F. oscillator may be reversed directly. Thus a reactance tube controlled oscillator could be employed to generate the R.F. signal and when a 180° phase shift is desired, the frequency of the oscillations could be momentarily changed until the desired phase shift has occurred. This oscillator could be synchronized by a second oscillator, crystal-controlled at a frequency which is twice the desired R.F. frequency, in which event the output of the reactance tube oscillator would lock in with the crystal-controlled oscillator at 0° or 180°, but could be quickly changed from one phase to the other. This is equivalent to a phase modulation system where a constant frequency is employed and the phase deviation is 180°. Accordingly the appended claims are not limited by the specific embodiments and examples herein disclosed.

In the claims where the macroscopic moment is said to be nutated in a given direction, it will be understood that this is the direction of nutation as viewed from the rotating frame of reference described above.

I claim:

1. In a method for obtaining signals representative of magnetic resonance phenomena in particles exhibiting paramagnetic properties wherein a substantially constant magnetic field is applied to said particles, the steps of applying an alternating magnetic field to said particles substantially at right angles to said constant field and having a frequency substantially equal to the resonance precession frequency of said particles in said constant field, and prior to thermal equilibrium periodically reversing the phase of said alternating magnetic field.

2. In a method for obtaining signals representative of magnetic resonance phenomena in particles exhibiting paramagnetic properties wherein a substantially constant magnetic field is applied to said particles, the steps of applying an alternating magnetic field to said particles substantially at right angles to said constant field and having a frequency substantially equal to the resonance precession frequency of said particles in said constant field, and periodically reversing the phase of said alternating magnetic field after intervals given by $2\pi/\gamma H_1$ where $\gamma$ is the gyromagnetic ratio for said particles and $H_1$ is the effective intensity of said alternating magnetic field.

3. In a method for obtaining signals representative of magnetic resonance phenomena in particles exhibiting paramagnetic properties wherein a substantially constant magnetic field is applied to said particles, the steps of applying an alternating magnetic field to said particles substantially at right angles to said constant field and having a frequency substantially equal to the resonance precession frequency of said particles in a constant field, reversing the phase of said alternating magnetic field after a first interval given by $2\pi/\gamma H_1$ where $\gamma$ is the gyromagnetic ratio for said particles and $H_1$ is the effective intensity of the said alternating magnetic field, reversing the phase of said alternating magnetic field after a second interval given by $4\pi/\gamma H_1$, and removing said alternating magnetic field after a third interval given by $2\pi/\gamma H_1$.

4. In a method for obtaining signals representative of magnetic resonance phenomena in particles exhibiting paramagnetic properties wherein a substantially constant magnetic field is applied to said particles, the steps of applying an alternating magnetic field to said particles substantially at right angles to said constant field and having a frequency substantially equal to the resonance precession frequency of said particles in said constant field, reversing the phase of said alternating magnetic field after a first interval given by $2\pi/\gamma H_1$ where $\gamma$ is the gyromagnetic ratio for said particles and $H_1$ is the effective intensity of the said alternating magnetic field, thereafter periodically reversing the phase after each interval given by $4\pi/\gamma H_1$, and removing said alternating magnetic field after a third interval given by $2\pi/\gamma H_1$.

5. In a method for obtaining signals representative of magnetic resonance phenomena in particles exhibiting para-magnetic properties wherein a substantially constant magnetic field is applied to said particles, the steps of applying a first alternating magnetic field to said particles substantially at right angles to said constant field during a first time interval, said alternating magnetic field having a frequency substantially equal to the resonance precession frequency of said particles in said constant field, permitting a period of free precession following said first time interval, applying a second alternating magnetic field at right angles to said constant field during a second time interval following said period and prior to thermal equilibrium, said second field having the same frequency but opposite phase as said first field, and detecting the presence of any alternating magnetic field at said resonance precession frequency during a period following said second time interval.

6. In a method for obtaining signals representative of magnetic resonance phenomena in particles exhibiting paramagnetic properties wherein a substantially constant magnetic field is applied to said particles, the steps of applying a first alternating magnetic field of effective intensity $H_1$ to said particles substantially at right angles to said constant field during a first time interval given by $\pi/2\gamma H_1$ where $\gamma$ is the gyromagnetic ratio for said particles, said alternating magnetic field having a frequency substantially equal to the resonance precession frequency of said particles in said constant field, permitting a first period of free precession following said first time interval, applying after said first period a second alternating magnetic field of effective intensity $H_2$ to said particles substantially at right angles to said constant field during a second time interval given by $\pi/\gamma H_2$, said second alternating magnetic field having the same frequency but opposite phase to said first field, and detecting the presence of any alternating magnetic field at said resonance precession frequency during a second period of free precession following said second time interval.

7. Apparatus for obtaining signals representative of magnetic resonance phenomena in particles exhibiting paramagnetic properties wherein a substantially constant magnetic field is applied to said particles, comprising a coil disposed substantially at right angles to said constant magnetic field for providing an alternating magnetic field through said particles perpendicular to said constant field when alternating current is applied to said coil, means for generating alternating current of frequency substantially equal to the resonance precession frequency of said particles in said constant field, means coupling said generating means and said coil for periodically reversing the phase of the alternating current applied to said coil, and means for detecting resonance of said particles.

8. Apparatus for obtaining signals representative of magnetic resonance phenomena in particles exhibiting paramagnetic properties wherein a substantially constant magnetic field is applied to said particles, comprising a first coil disposed substantially at right angles to said constant magnetic field for providing an alternating magnetic field through said particles perpendicular to said constant field when alternating current is applied to said coil, means for generating alternating current of frequency substantially equal to the resonance precession frequency of said particles in said constant field, means coupling said generating means and said first coil for periodically reversing the phase of the alternating current applied to said first coil, a second coil disposed substantially at right angles to said first coil and to said constant magnetic field, means coupled to said second coil for reversing the phase of any voltage induced in said second coil at times midway between phase reversals of said alternating current, and detecting means coupled to said phase reversing means responsive to any voltage at the precession frequency having no phase reversal therein.

9. Apparatus for obtaining signals representative of magnetic resonance phenomena in particles exhibiting paramagnetic properties wherein a substantially constant magnetic field is applied to said particles, comprising a first coil disposed substantially at right angles to said constant magnetic field for providing an alternating magnetic field through said particles perpendicular to said constant field when alternating current is applied to said coil, means for generating alternating current of frequency substantially equal to the resonance precession frequency of said particles in said constant field, means coupling said generating means and said first coil for periodically reversing the phase of the alternating current applied to said first coil, a second coil disposed substantially at right angles to said first coil and to said constant magnetic field, amplifying means coupled to said second coil, means coupled to said amplifying means for detecting any signal in the output thereof resulting from direct coupling between said first and second coils, means for applying to the input of said amplifying means a voltage 180° out of phase with said direct coupling signal, and means coupled to said detecting means for varying the amplitude of said 180° out of phase voltage whereby any voltage directly induced in said second coil from said first coil is maintained substantially at zero, and means for detecting the resulting output of said amplifying means.

10. Apparatus for obtaining an electrical signal representative of magnetic resonance phenomena in paramagnetic particles subjected to a polarizing magnetic field comprising means for applying an alternating magnetic field to said particles effectively rotating substantially perpendicularly to said polarizing magnetic field at a frequency substantially equal to the resonance precession frequency of said particles in said polarizing field, whereby the macroscopic magnetic moments associated with said particles precess at said resonance precession frequency in essentially fixed phase relation with respect to said alternating field, means for reversing said phase relation, and means for detecting magnetic resonance in said particles.

11. Apparatus for obtaining an electrical signal representative of magnetic resonance phenomena in paramagnetic particles subjected to a polarizing magnetic field comprising means for applying an alternating magnetic field to said particles effectively rotating substantially perpendicularly to said polarizing magnetic field at a frequency substantially equal to the resonance precession frequency of said particles in said polarizing field, whereby the macroscopic magnetic moments associated with said particles precess at said resonance precession frequency in essentially fixed phase relation with respect to said alternating field, means for periodically reversing said phase relation during a time interval short with respect to the relaxation time associated with said phenomena, and means for detecting magnetic resonance in said particles.

12. Apparatus for obtaining an electrical signal representative of magnetic resonance phenomena in paramagnetic particles subjected to a polarizing magnetic field comprising means for applying an alternating magnetic field to said particles substantially perpendicularly to said polarizing magnetic field and at a frequency substantially equal to the resonance precession frequency of said particles in said polarizing field, control means for controlling the relative phase of said alternating field such that said alternating field may have a first phase or a second phase substantially 180° out of phase in said particles with respect to said first phase, timing means coupled to said control means for establishing a cycle of operation including first, second and third successive time intervals short with respect to the relaxation time associated with said phenomena, said alternating field having said first phase during said first time interval, said alternating field not being applied during said second time interval to permit a period of free precession, said alternating field having said second phase during said third time interval, and means for detecting magnetic resonance in said particles.

13. Apparatus for obtaining an electrical signal representative of magnetic resonance phenomena in paramagnetic particles subjected to a polarizing magnetic field comprising means for applying an alternating magnetic field to said particles substantially perpendicularly to said polarizing magnetic field and at a frequency substantially equal to the resonance precession frequency of said particles in said polarizing field, control means for controlling the relative phase of said alternating field such that said alternating field may have a first phase or a second phase substantially 180° out of phase in said particles with respect to said first phase, timing means coupled to said control means for establishing a cycle of operation including first and second successive time intervals short with respect to the relaxation time associated with said phenomena, said alternating field having said first phase during said first time interval and having said second phase during said second time interval, and means for detecting magnetic resonance in said particles.

14. Apparatus for obtaining an electrical signal representative of magnetic resonance phenomena in paramagnetic particles subjected to a polarizing magnetic field comprising means for applying an alternating magnetic field to said particles substantially perpendicularly to said polarizing magnetic field and at a frequency substantially equal to the resonance precession frequency of said particles in said polarizing field, control means for controlling the relative phase of said alternating field such that said alternating field may have a first phase or a second phase substantially 180° out of phase in said particles with respect to said first phase, timing means coupled to said control means for establishing a cycle of operation including first and second successive time intervals short with respect to the relaxation time associated with said phenomena, said alternating field having said first phase during said first time interval and having said second phase during said second time interval, and means coupled to said timing means for detecting magnetic resonance in said particles in periods of free precession during said first and second time intervals.

15. Apparatus for obtaining an electrical signal representative of magnetic resonance phenomena in paramagnetic particles subjected to a polarizing magnetic field comprising means for applying an alternating magnetic field to said particles substantially perpendicularly to said polarizing magnetic field and at a frequency substantially equal to the resonance precession frequency of said particles in said polarizing field, control means for controlling the relative phase of said alternating field such that said alternating field may have a first phase or a second phase substantially 180° out of phase in said particles with respect to said first phase, timing means coupled to said control means for establishing a cycle of operation including first and second successive time intervals short with respect to the relaxation time associated with said phenomena with a period of free precession during each of said first and second time intervals, said alternating field having said first phase during said first time interval and having said second phase during said second time interval, and means coupled to said timing means for detecting magnetic resonance in said particles during said periods of free precession.

16. Apparatus for obtaining an electrical signal representative of magnetic resonance phenomena in paramagnetic particles subjected to a polarizing magnetic field comprising means for applying an alternating magnetic field to said particles substantially perpendicularly to said polarizing magnetic field and at a frequency substantially equal to the resonance precession frequency of said particles in said polarizing field, control means for controlling the relative phase of said alternating field such that said alternating field may have a first phase or a second phase substantially 180° out of phase in said particles with respect to said first phase, timing means coupled to said control means for establishing a cycle of operation including first, second, third and fourth successive time intervals short with respect to the relaxation time associated with said phenomena, said alternating field having said first phase during said first time interval, said alternating field not being applied during said second and fourth time intervals to permit periods of free precession, said alternating field having said second phase during said third time interval, and means coupled to said timing means for detecting magnetic resonance in said particles during said fourth time interval.

17. Apparatus for obtaining an electrical signal representative of magnetic resonance phenomena in paramagnetic particles subjected to a polarizing magnetic field comprising means for applying an alternating magnetic field to said particles substantially perpendicularly to said polarizing magnetic field and at a frequency substantially equal to the resonance precession frequency of said particles in said polarizing field whereby the macroscopic magnetic moments associated with said particles nutate in said polarizing field, control means for controlling the relative phase of said alternating field such that said alternating field may have a first phase or a second phase substantially 180° out of phase in said particles with respect to said first phase, timing means coupled to said control means for establishing repetitive cycles of operation, each cycle including a plurality of successive first and second time intervals followed by a period of relaxation, said plurality of intervals being short with respect to the relaxation time associated with said phenomena, said alternating field having said first phase during said first time intervals and having said second phase during said second time intervals, said periods of relaxation being initiated at instants when said moments are substantially in line with said polarizing field, and means for detecting magnetic resonance in said particles.

18. A method for obtaining signals representative of magnetic resonance phenomena in paramagnetic particles subjected to a polarizing magnetic field, comprising the steps of applying to said particles magnetic fields effectively rotating at the resonant precessional frequency of said particles in said polarizing field in alternately opposite directions during an interval short with respect to the relaxation time associated with the macroscopic moment of said particles correspondingly to produce an apparent nutation of the macroscopic moment in alternately opposite directions, terminating the application of said rotating fields at an instant when said moment is substantially in line with said polarizing field, and repeating the foregoing steps after a period of relaxation following such termination.

19. A method for obtaining signals representative of magnetic resonance phenomena in particles exhibiting paramagnetic properties wherein a substantially constant magnetic field is applied to said particles, comprising the steps of applying to said particles magnetic fields effectively rotating at the resonant precessional frequency of said particles in said constant field in successive alternate directions during an interval short with respect to the relaxation time associated with the macroscopic moment of said particles correspondingly to produce an apparent nutation of said macroscopic moment associated with said particles in alternate directions.

20. A method for obtaining signals representative of magnetic resonance phenomena in particles exhibiting paramagnetic properties wherein a substantially constant magnetic field is applied to said particles, comprising the steps of applying to said particles a magnetic field effectively rotating at the resonant precessional frequency of said particles in said constant field in a first direction during a first time interval to produce an apparent nutation of the macroscopic moment associated with said particles in a first sense, and applying to said particles a magnetic field effectively rotating at such frequency in a direction opposite to said first direction during a second time interval following said first time interval by a period of free precession to produce an apparent nutation of said macroscopic moment in a sense opposite to said first sense, said first and second time intervals and said period being short with respect to the relaxation time associated with said moment.

21. A method for obtaining signals representative of magnetic resonance phenomena in particles exhibiting paramagnetic properties wherein a substantially constant magnetic field is applied to said particles, comprising the steps of applying to said particles a magnetic field effectively rotating at the resonant precessional frequency of said particles in said constant field in a first direction during a first time interval to produce an apparent nutation of the macroscopic moment associated with said particles in a first sense, applying a magnetic field effectively rotating at such frequency in a second direction opposite to said first direction during a second time interval following said first time interval to produce an apparent nutation of said macroscopic moment in a second sense opposite to said first sense, said first and second time intervals being short with respect to the relaxation time associated with said moment, and detecting the magnetic resonance of said particles during said first and second time intervals.

22. A method for obtaining signals representative of magnetic resonance phenomena in particles exhibiting paramagnetic properties wherein a substantially constant magnetic field is applied to said particles, comprising the steps of applying a first alternating magnetic field to said particles substantially at right angles to said constant field during the first time interval, said alternating magnetic field having a frequency substantially equal to the resonant precession frequency of said particles in said constant field, applying a second alternating magnetic field at right angles to said constant field during a second time interval subsequent to a first period of free precession following said first time interval and prior to a second period of free precession, said second field having the same frequency as said first field but opposite phase, the duration of said first and second time intervals and periods terminating prior to thermal equilibrium, and detecting the magnetic resonance of said particles during said periods of free precession.

23. In a method for obtaining signals representative of magnetic resonance phenomena in particles exhibiting paramagnetic properties wherein a substantially constant magnetic field is applied to said particles, the steps of applying to said particles an alternating magnetic field substantially at right angles to said constant field at a frequency substantially equal to the resonant precession frequency of said particles in said constant field and with a first phase during a first time interval and a second phase opposite to said first phase during a second time interval following said first time interval, said first and second time intervals being of a duration to produce an apparent nutation of the macroscopic moment associated with said particles through the same angle but in alternate senses where such angles are in the range between 90° and 1440°, inclusive.

24. In a method for obtaining signals representative of magnetic resonance phenomena in particles exhibiting paramagnetic properties wherein a substantially constant magnetic field is applied to said particles, the steps of applying an alternating magnetic field to said particles substantially at right angles to said constant field at a frequency substantially equal to the resonant precession frequency of said particles in said constant field with a first phase during a first time interval, a second opposite phase during a second time interval, and said first phase during a third time interval, in succession, the duration of said time intervals being such as to obtain an apparent nutation of the macroscopic moment associated with said particles through substantially $\theta$ degrees in a first sense during said first time interval, through $n\theta$ degrees in an opposite sense during said second time interval, and through substantially $\theta$ degrees in said first sense during said third time interval, where $\theta$ is in the range between 90° and 1440°, inclusive, and $n$ is a whole number greater than one and less than five.

25. In a method for obtaining signals representative of magnetic resonance phenomena in particles exhibiting paramagnetic properties wherein a substantially constant magnetic field is applied to said particles, the steps of applying an alternating magnetic field to said particles substantially at right angles to said constant field at a frequency substantially equal to the resonant precession frequency of said particles in said constant field with a first phase during a first time interval, alternate phases corresponding with and opposite to said first phase during a second time interval, and said first phase during a third time interval, said time intervals occurring in succession with a duration such as to obtain an apparent nutation of the macroscopic moment associated with said particles through substantially $\theta$ degrees in a first sense during said first time interval, alternately through substantially $n\theta$ degrees during said second interval with the last of said $n\theta$ nutations being a sense opposite to said first sense, and through substantially $\theta$ degrees in said first sense during said third time interval, where $\theta$ is in the range between 90° and 1440°, inclusive, and $n$ is a whole number greater than one and less than five.

26. A method for obtaining signals representative of magnetic resonance phenomena in paramagetic particles subjected to a polarizing magnetic field, comprising the steps of applying an alternating magnetic field to said particles substantially at right angles to said polarizing field at a frequency substantially equal to the resonant precession frequency of said particles in said polarizing field with a first phase during a first time interval and with an opposite phase during a second time interval following a period of free precession subsequent to said first time interval, the duration of said first time interval being such as to obtain an apparent nutation of the macroscopic moment associated with said particles to a first position at an angle with respect to the direction of said polarizing magnetic field and the duration of said second interval being such as to obtain an apparent nutation of said moment in an opposite sense to a position at an angle with respect to said first position, and detecting the presence of any alternating magnetic field at said resonance precession frequency during a period of free precession immediately following the aforesaid nutation in said opposite sense.

27. A method for obtaining signals representative of magnetic resonance phenomena in paramagnetic particles subjected to a polarizing magnetic field, comprising the steps of applying to said particles magnetic fields effectively rotating at the resonant precessional frequency of said particles in said polarizing field in successive alternate directions during first and second intervals short with respect to the relaxation time associated with the macroscopic moment of said particles correspondingly to produce an apparent nutation of said macroscopic moment in a first sense to a first position substantially 90° away from the direction of said polarizing magnetic field, then to a position substantially 180° away from said first position following a period of free precession, and detecting the presence of any alternating magnetic field at the resonant precession frequency of said particles during a period of free precession immediately following said 180° nutation.

28. A method for obtaining signals representative of magnetic resonance phenomena in paramagnetic particles subjected to a polarizing magnetic field, comprising the steps of applying to said particles magnetic fields effectively rotating at the resonant precessional frequency of said particles in said polarizing field in a first direction during a first interval and in successive alternate directions during a second interval short with respect to the relaxation time associated with the macroscopic moment of said particles correspondingly to produce an apparent nutation of the macroscopic moment in a first sense to a first position substantially 90° away from the direction of said polarizing magnetic field and after a period of free precession through substantially 180° in alternate senses, and detecting the presence of any alternating magnetic field at said resonant precessional frequency during a period of free precession following each 180° nutation.

29. A method as defined in claim 28, wherein the steps therein recited are repeated after a period permitting said particles to reach thermal equilibrium.

30. A method for obtaining signals representative of magnetic resonance phenomena in paramagnetic particles subjected to a polarizing magnetic field comprising the steps of applying to said particles magnetic fields effectively rotating at the resonant precessional frequency of said particles in successive alternate directions during first and second intervals spaced by a period of free precession and having a duration short with respect to the relaxation time associated with the macroscopic moment of said particles correspondingly to produce an apparent nutation of said macroscopic moment in a first sense to a first position substantially 90° away from the direction of said polarizing magnetic field and, after said period of free precession, in an opposite sense through substantially 180°, detecting the presence of any alternating magnetic field at said resonant precessional frequency during a period of free precession immediately following said 180° nutation, and applying said effectively rotating magnetic field for a third interval correspondingly to produce an apparent nutation of said macroscopic moment through substantially 90° in said first sense.

References Cited in the file of this patent

UNITED STATES PATENTS

| | | |
|---|---|---|
| 2,561,489 | Block et al. | July 24, 1951 |
| 2,705,790 | Hahn | Apr. 5, 1955 |

OTHER REFERENCES

Torrey: Physical Review, vol. 76, No. 8, Oct. 15, 1949, pp. 1059–1066.

Spin Echoes, by E. L. Hahn, published in Physical Review, vol. 80, No. 4, Nov. 15, 1950, pages 580–594.